Dec. 31, 1968
J. H. LEMELSON
3,419,158
ADJUSTABLE MACHINERY JOINT
Original Filed Jan. 14, 1963
Sheet 1 of 3
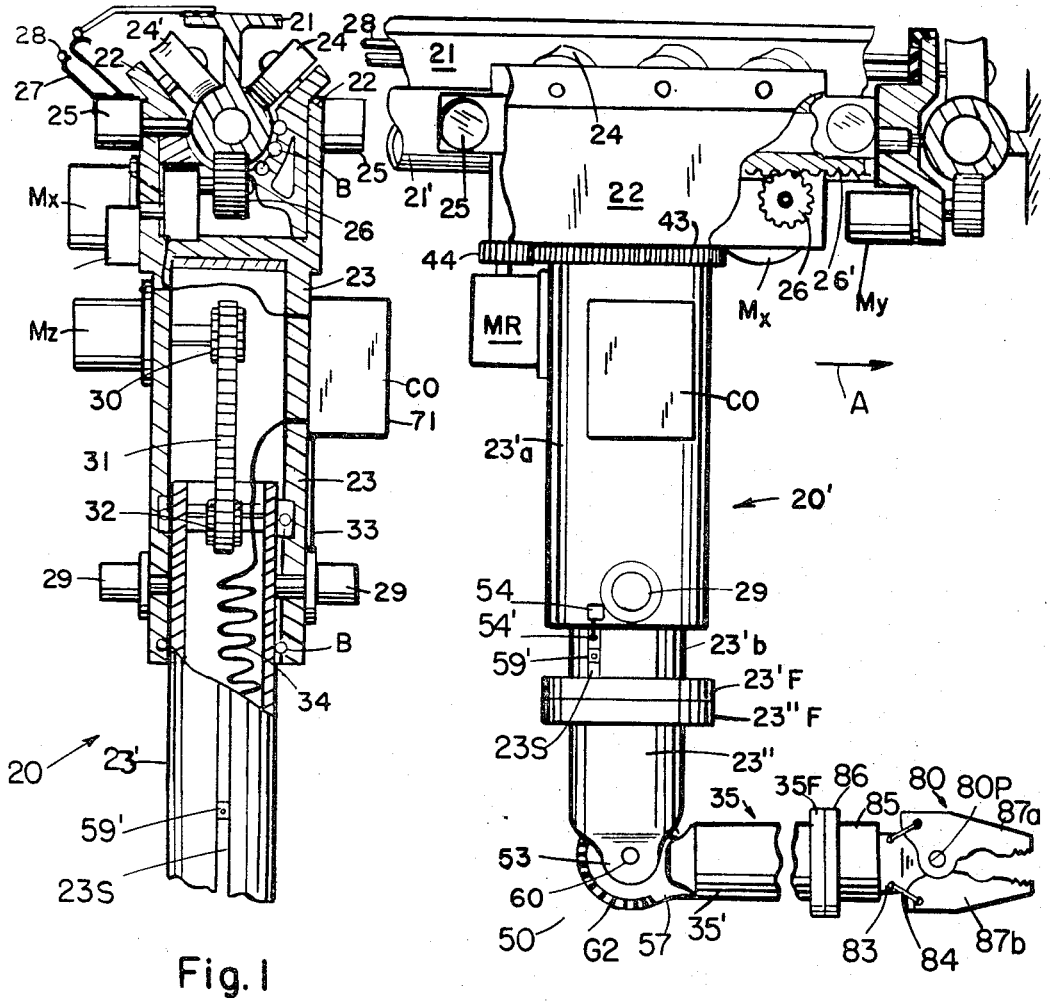
Fig. 1
Fig. 2
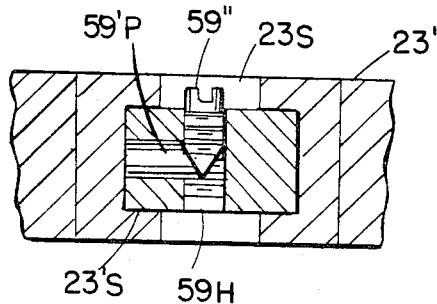
Fig. 2'
INVENTOR.
Jerome H. Lemelson Dec. 31, 1968 J. H. LEMELSON 3,419,158
ADJUSTABLE MACHINERY JOINT
Original Filed Jan. 14, 1963 Sheet 2 of 3

INVENTOR.
Jerome H. Lemelson

INVENTOR.
JEROME H. LEMELSON ously supported off the overhead track and are swept
United States Patent Office 3,419,158
Patented Dec. 31, 1968

3,419,158
ADJUSTABLE MACHINERY JOINT
Jerome H. Lemelson, 85 Rector St.,
Metuchen, N.J. 08840
Original application Jan. 14, 1963, Ser. No. 251,411, now Patent No. 3,260,375, dated July 12, 1966, which is a continuation-in-part of application Ser. No. 477,467, Dec. 24, 1954. Divided and this application Oct. 22, 1965, Ser. No. 501,177
1 Claim. (Cl. 214—1)

ABSTRACT OF THE DISCLOSURE

An adjustable machinery joint is provided which is applicable in the construction of various production machines and article manipulators. Power-operated means is provided for relatively moving the components or assemblies secured to the joint for performing predetermined operations during a manufacturing or article transfer cycle. Means are provided for predeterminately moving the joint assemblies with respect to each other and locking said assemblies when they are predeterminately located to prevent further movement thereof during the operation of a device associated with at least one of said assemblies. In this manner, variable forces which may be applied to the joint may be prevented from uncontrollably moving or shifting the assemblies secured to the joint.

---

This invention relates to automatic article manipulation apparatus and is a division of application Ser. No. 251,411, filed Jan. 14, 1963, now Patent No. 3,260,375, which in turn is a continuation-in-part of application Ser. No. 477,467, now abandoned.

This invention is particularly concerned with article manipulation apparatus and tooling which is automatically controllable in a predetermined cycle of operative movements to perform many different functions associated with manufacturing operations which would ordinarily require the labor of one or more human beings. Heretofore, article manipulation apparatus has consisted of specialized, inflexible equipment designed and developed to perform a particular work tool or article manipulation function automatically. Other article manipulation devices have been developed since the filing of my parent application, Ser. No. 477,467 and are illustrated in said application which was programmable by means of presettable means or command signals generated from recordings. However, such apparatus is relatively complex and costly since it involves, in addition to variable controls, feedback control elements, motor speed and braking controls and a programming means or positional computer. Accordingly, it is a primary object of this invention to provide a new and improved article or tool manipulating apparatus which is adjustably controllable and is relatively simple in structure.

Another object is to provide a manipulating apparatus of new design having a modular structure which may be easily varied both as to the physical dimensions of the apparatus and its automatic operation.

Another object is to provide a manipulating apparatus for articles or tools capable of automatic recycling movements which may be cyclically varied without resort to a programming device.

Another object is to provide an article manipulation apparatus which is cyclically operative to perform various movements in a given realm by means of a plurality of limit switches and positionably variable means for actuating said limit switches.

Another object is to provide an improved variable control system for article and tool manipulation apparatus which is cyclically operative by means of limit switches and does not require a programming means.

Another object is to provide an improved structure in a manipulator joint including means for electrically controlling the relative movement of components of said joint.

Another object is to provide an improved means for controlling the rotation of a manipulator arm relative to a base or second arm.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

FIG. 1 is a partial view with parts broken away for clarity of a manipulation apparatus suspended from an overhead track;

FIG. 2 is a side view of a manipulation apparatus which is a modification of that illustrated in FIG. 1;

Figure 3:
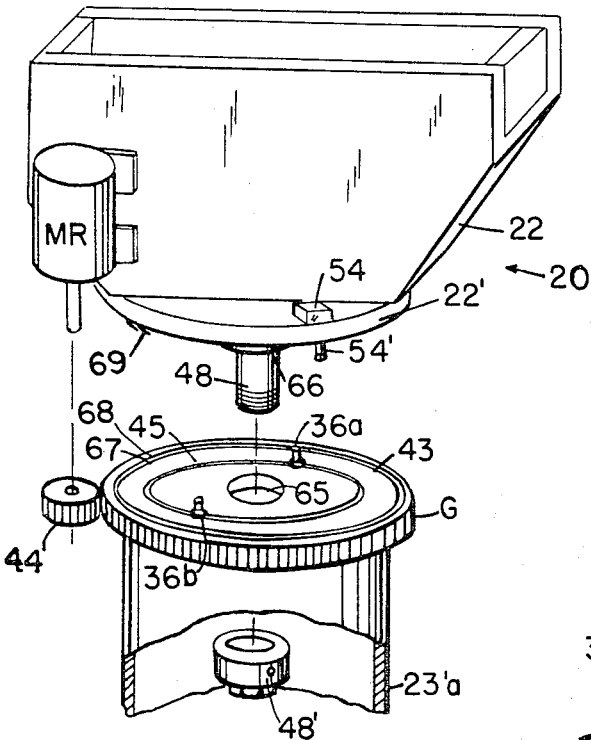
Figure 4:
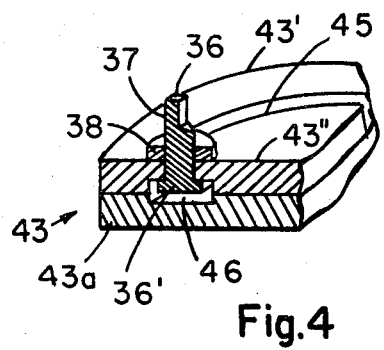
Figure 5:
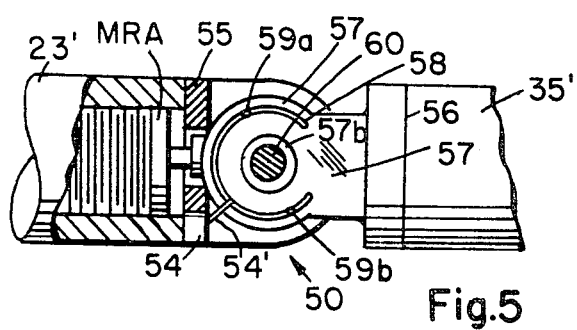
Figure 6:
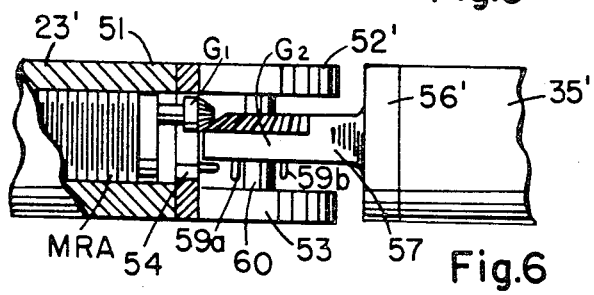

FIG. 2' is a sectional view taken through one of the manipulator arms of FIGS. 1 and 2;

FIG. 3 is a partial view of a manipulation apparatus showing parts broken away and exploded for clarity;

FIG. 4 is a sectioned view showing a fragment of part of the apparatus of FIG. 3;

FIG. 5 is a partially sectioned view of a rotary manipulator joint of the type illustrated in FIG. 2;

FIG. 6 is a partially sectioned view of the joint of FIG. 5; and

Figure 7:
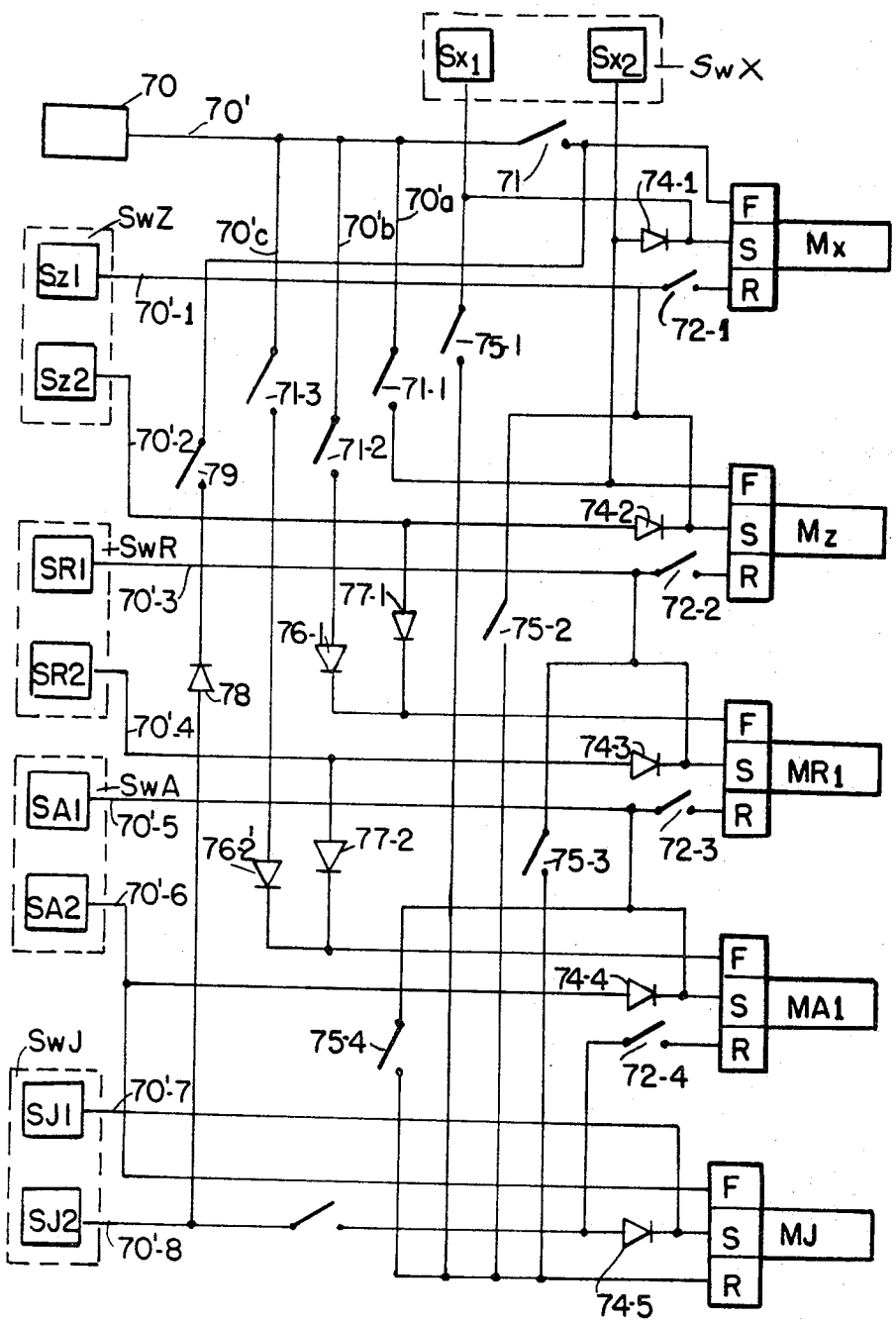

FIGURE 7 is a schematic diagram of control circuitry for the apparatus illustrated in FIGURES 1-6.

FIGS. 1 and 2 illustrate details of two arrangements of article manipulation apparatus or tool, certain portions of which form part of this invention and are illustrated in the other drawings. Part of a typical automatic production apparatus 20 is shown in FIG. 1 and application of certain of the features of the apparatus of FIG. 1 to an automatic article manipulator apparatus 20' is shown in FIG. 2.

The apparatus comprises an overhead support or trackway 21 along which a tool or manipulator may be conveyed by means of a carriage 22 and a plurality of movable linkages or arms. In FIG. 1 a first arm or column 23 is integrally secured to the overhead carriage 22 and supports a plurality of components including a second arm 23' which is a tubular cylinder adapted for vertical movement through the bore 23B of the column 23. A plurality of wheels 24, 24' are supported in bearing by formations 22' defining sidewall portions of the carriage 22 and ride along the lower cylindrical portion 21' of the overhead track 21 for movement of the carriage assembly therealong. A reversible electrical gear motor M$x$ is secured to the side wall of the carriage 22 and has its output shaft driving a toothed wheel 26 which engages a toothed track 26' cut in the lower surface of the portion 21' of overhead track 21. Thus by controlling the operation of motor M$x$, the position of the carriage 22 and its manipulator or tool assembly may be predetermined along track 21 for performing predetermined operations on work-in-process which is prepositioned or which follows a predetermined path relative to the overhead track. Electrical power for the servo motors associated with the assembly 20 or 20' is derived from overhead wires 28 which are insulatedly supported off the overhead track and are swept by respective electrical brushes or sliding elements 27 which are insulatedly supported off the carriage 22 and extend to respective of the servo motors to be controlled or to a positional computing mechanism CO located in a housing CO′ which is shown mounted along the side wall of the column 23. Thus signals transmitted along the overhead wires may be utilized to preset or otherwise control the positional computer CO as well as to supply electrical energy for the operation of said computer and the servo motors to be described. Notation B refers to steel balls mounted within receptacles in the wall of the carriage 22 to provide rolling engagement with the cylindrical portion 21′ of the overhead track to simplify the movement of 22 therealong. Notation 25 refers to lineal actuators or servos mounted against the side walls of the overhead carriage 22 which, when activated, are adapted to project their respective actuating arms to engage the wall of the track and to lock the carriage in position.

A reversible gear motor M$z$ is shown secured to the side wall of column 23 and has a pulley or sprocket wheel 30 secured to its output shaft. A drive belt or chain 31 loops over the sprocket 30 and around a second pulley or sprocket 32 which is supported for rotation within the upper end of the column 23′. The drive chain 31 is thus operative to raise and lower column 23′ within column 23 depending on the direction of rotation of the output shaft or motor M$z$. Lineal actuators or solenoids 29 mounted on the side wall of 23 are utilized to engage the surface of the column 23′ and to lock it in place when 23′ is in a predetermined vertical position. Notation 33 refers to the wire connecting the locking actuators 29 with the positional computer CO which controls not only the position in which 23′ is stopped and locked but also the degree of operation of the other servos including the locking actuators 25, M$x$, M$z$ and those to be described.

Whereas in FIG. 1 column 23 is fixed relative to the overhead carriage 22, in FIG. 2 the column 23′$a$ is rotationally supported by the overhead carriage. A large spur gear 43 is shown secured to the bottom wall of carriage 22 and the column 23′$a$ is supported on a vertical shaft and bearing (not shown). A reversible gear motor MR is secured to the wall of column 23′$a$ near the upper end thereof and has a small spur gear 44 secured to its output shaft and engaging the teeth of gear 43. Thus as motor MR operates, the column 23′$a$ and the assembly therebelow will rotate in a direction depending on the direction of rotation of the output shaft of MR.

In FIG. 2 a second cylindrical column 23′$b$ is longitudinally movable with in the bore of column 23′$a$ and has a flange 23′F secured to the end thereof. A third column 23″ having an upper flange 23″F is secured to the column 23′$b$ by retaining the two flanges together with fasteners. Thus various assemblies, arms and fixtures may be secured to the end of column 23′$b$ depending on the operation to be performed by the apparatus 20′.

The other end of column 23″ is provided with a yoke formation 53, shown in detail in FIGS. 5 and 6, which supports a pin or shaft 60 on which is rotationally supported a gear plate 57 which is secured to a further arm assembly including jaw means 87 at the end thereof for seizing and releasing an article. Notation 50 refers to the entire joint assembly, which will be described and 35 to the manipulator assembly extending outward from said joint assembly. Assembly 35 comprises a first arm 35′ of cylindrical tubular shape, a flange 35$f$ at the end thereof, a second arm 85 having a flange 86 and rotationally supported at the end of 35′ is secured to a jaw assembly 80 which includes openable and closable jaws 87$a$ and 87$b$. The jaws 87$a$ and 87$b$ are pivotally mounted on pin 80P supported at the end of a base 83 secured to arm 85 and are operated by respective servos or a single servo through linkages 84 as illustrated in application Ser. No. 477,467.

The apparatus illustrated in FIGS. 1 and 2 is subject to a substantial degree of variation. By providing simple assembly and disassembly means for the joints defined between components 23, 23′; 23′$a$, 43; 23″, 23′$b$; 35′, 23″; 85, 35′ and the jaw assembly base 83 and 85, it is easily seen that devices and assemblies of the various configurations may be fabricated by varying the shape, length and configurations of said arms and the type of tool or article seizing means secured to the assembly.

The jaws or other manipulation means defining the end of the manipulator assembly may be replaced with means for retaining an article by gravity such as forks or a platform protruding from one of the illustrated arms. For example, either the jaw members comprising assembly 80 or the assembly defined by the notation 35 in FIG. 2 may be replaced by a platform or a pair of article handling forks and may be manipulated by the means described to be positioned under a pallet, tote box or article and to effect lifting and transporting said article when the other power means are operated in sequence as described hereafter or the platform or forks may be utilized as a transfer means which is automatically positioned to receive articles from a conveyor, chute, machine, etc. and operated cyclically thereafter as described or when a limit switch positioned on said platform (such as relay 70 of FIG. 7) senses the article or is actuated thereby when said article moves onto or is engaged thereby. Magnetic, suction or other forms of article seizing or handling means may also replace the jaws 80 illustrated in FIG. 2 as may a variety of different power operated devices designed to perform an operation or transfer function relative to work-in-process. Reference is made to application Ser. No. 477,467 for various devices which may be utilized in place of the assembly 80.

As stated, in a preferred mode of operation, the apparatus of FIGS. 1 and 2 may be operated solely by the actuation of a plurality of limit switches and adjustable actuation means associated with the various manipulator arms. In other words, limit switch control means may be utilized not only to effect the controlled movement and prepositioning of the carriage 22 to a predetermined location along the overhead track 21 but also to effect the degree of downward and upward movement of the column 23′$a$ below the carriage 22, the degree of rotation of the first manipulator arm 35′ relative to the column 23″ in a first direction and its return on the opposite direction, the degree of rotation of the manipulator arm or base 85 relative to the arm 35′ in a first direction and its return to a starting or home position and the sequencing and degree of opening and closing of the jaws 87$a$ and 87$b$ of the article seizing means 80 at the end of arm 85.

In FIGS. 1 and 2 adjustable limit defining means is provided for activating a limit switch 54 which is shown secured to the lower portion of the column or arm 23′$a$ and has a actuator arm 54′ extending in the direction of the column 23′. The column 23′ is shown in FIGS. 1 and 2 as having an elongated channel or slot 23S provided in the side wall thereof and extending along a substantial portion of the length of 23′ parallel to its longitudinal axis. Two stops 59′, which are operative upon respective upward and downward movement of column 23′, to cause actuation of the limit switch actuator arm 54′ to activate said switch. Details of the stops and the structure of the walls of the slot 23S are shown in FIG. 2′ which is a lateral cross sectional view of the wall of column 23′. Each wall of the slot is indented as illustrated at 23′S′ providing respective channels in which the rectangular stop 59′ is slidably movable up and down the column 23′. A threaded hole 59H extends through 59′ between the major surfaces thereof and a threaded screw 59″ having a conical nose is threaded to engage in said hole. A second hole extends lateral to the axis of hole 59H and contains a pin 59′P one end of which is forced against the inside wall of the channel 23′S′ when the slotted head fastener 59″ engages the tapered rear face of 59′P, thereby locking the limit switch actuator 59′ in a selected position along the longitudinal slot 23S. The arm 54′ of the limit switch 54 is preferably rounded or contains a wheel at its end which is positioned to ride against the exposed upward face of the block 59' when column 23' moves upward to close contacts of the limit switch 54 which action is operative to stop the motor Mz and start a second motor such as that located within column 23" for rotating arm 35' relative thereto. Limit switch control of the downward movement of column 23' relative to 23 is effected by a second block similar to 59' and located at some predetermined position along the upper portion of the slot 23S but not shown in FIG. 2 as it is situated along a portion of the column 23' which is located within column 23. The actuator arm 54', in riding against the downward side of the actuator block 59', positioned along the upper portion of slot 23S, is deflected and moved thereby to actuate the switch 54 to effect such actions as stopping the motor Mz to preposition the assembly including 23' at a predetermined downward location and starting, for example, the motor located within 23" for rotating arm 35' in the opposite direction to that in which it was rotated during the prior activation of switch 54.

It is briefly noted that other means, adjustable along either column 23 or 23' may also be applicable for defining the limits of travel of 23'. For example, the means illustrated in FIG. 4 or other means such as a proximity switch or limit switch operating by means of photoelectrically scanning adjustable indicia or reflective markers replacing the physical stops, may also be applied.

FIG. 3 is a partially exploded view showing details of a rotatable joint assembly such as that defined between components 23'a and carriage 22 or arms 35' and 85. Whereas in FIG. 2 the motor MR is shown secured to the wall of the column 23'a, in FIG. 3 said motor is secured to the wall of the carriage 22 and the large gear 43' is secured to the upper end of the column 23'a. Welded to the bottom wall of 22 is a large circular plate 22' approximately equal in diameter to the diameter of gear 43. Also secured to and extending downward from the carriage assembly 22 is a large threaded axle or pin 48 on which the entire manipulator arm assembly is supported by means of a thrust bearing 48' which is pinned to the end of the shaft 48 after passing through a bore 65 in the center of the gear plate 43'.

Apparatus of the type illustrated in FIGS. 1 and 2 may be automatically controlled to perform a predetermined operation on work-in-process by means of a sequential controller or positional computer which may operate per se to energize and deenergize the forward and reverse controls of the various servo motors utilized to effect movement of one arm member relative to another or in cooperation with the control afforded by one or more limit switches which define the degree of rotation of one component of the joint relative the other arm or assembly. In FIG. 3, a limit switch 54' is secured to the plate 22' and has an actuator arm 54" extending downward through an opening therein. The switch 54' is a mono-stable switch in which the arm 54' is spring-urged to a center-neutral position until it is urged in either or two directions to close either or two sets of contacts or a single pair of contacts, depending on the control to be effected. In FIG. 3 the degree of rotation of the assembly defined by column 23'a is controlled by respective stops 36a and 36b, each of which is adjustably positionable around a track 45 defined between an outer portion 43' of the gear plate 43 which is secured to the upper end of 23'a and an inner portion or plate 43". The position of the stops 36a and 36b define respective limits of rotation of the column 23'a since stop 36a will actuate the arm 54' of the limit switch 54 during rotation of the column in a first direction and stop 36b will actuate said limit switch arm during rotation thereof in a second direction. The contacts of limit switch 54 are electrically connected to one or more controls including the control for stopping the motor MR. If the apparatus illustrated in FIG. 1 is controlled by a series of movements of each arm or assembly relative to the others which are defined by making or breaking contacts of limit switches, and the switch 54 comprises two sets of contacts, then each of the contact pairs of said limit switches may be connected not only to the stop control for motor MR but electrically connected for energizing a start control for a respective further servo motor to effect a further mechanical action or movement when the assembly defined by column 23'a has reached a predetermined degree in its rotation.

By making the stops 36a and 36b adjustable to define different limits of travel or rotation of the manipulator assembly relative to the overhead carriage, the assembly and tool or manipulator thereof may be prepositioned at different locations in space for performing many different operations relative to different types of work-in-process or articles. Thus, a complex computer or contour control means will not be necessary for the automatic operation of the apparatus and its performance to meet various product handling requirements.

FIG. 4 illustrates details of means for adjustably positioning and locking the stop-members 36 relative to the circular gear member 43. The gear member 43 is shown as comprising a base plate 43a to which is welded an outer ring 43' and an inner disc 43" in spaced apart relation leaving a channel 45 therebetween. A circular cavity 46 having portions which extend radially inward and outward of the channel 45 is defined between plates 43a and 43' and 43". The stop element 36 consists of a threaded shank 37 and a head 36' of enlarged diameter which retains said element against the inside face of the circular opening 46. A nut 38 threads on the shank 37 and locks the element 36 in place when tightened against the outer faces of plates 43' and 43". Thus by loosening the nut 38, the fastening element 36 may be slidably moved around the channel 45 to a new position depending on the desired limit of rotation of the arm assembly relative to the carriage. It is briefly noted that the assembly illustrated in FIGS. 3 and 4 may be applied to the rotary joint defined between members 35' and 75 of FIG. 2 as well as other rotary joints associated with apparatus similar to that illustrated. Electrical connections across such a rotary joint may be effected by means of one or more circular, flat conducting strips such as 67 and 68 shown in FIG. 3 and insulatedly mounted against the upper face of gear plate 43' which conducting strips are engaged by brush elements 69 which are insulatedly supported in FIG. 3 near the peripheral border of the flat plate 22' and which brushes contact said flat elements 67, 68 upon assembly of the joint. The flat elements 67, 68 are connected to respective electrical wires which extend to the various controls and power inputs to the servo motors or electrically operated devices secured to the assembly defined by arm 23'a. It is briefly noted that the stop element assemblies 36 may be replaced by other easily adjustable means for actuating the switch 54 upon predetermined degrees of rotation of arm 23'a relative to 22.

FIGS. 5 and 6 illustrate details of a rotary joint such as that defined by the notation 50 in FIG. 2. Whereas the rotary joint of FIGS. 3 and 4 is defined by a rotational axis which is parallel to the longitudinal axes of at least one of the members, the joint 50 is defined by a rotational or pivotal axis which is substantially normal to the longitudinal axes of the arm members 23" and 35'. Both arm members are illustrated as being substantially cylindrically shaped metal tubes. Secured to the end of arm 23' is a fixture 51 defining yoke members 52 and 53 which yoke members support a pin or axle 60. Secured to the end of the other arm member 35' is a fixture 56 including a disc shaped base 56' which defines a semi-circular bevel gear having gear teeth G2 cut therein around approximately 240 degrees of the circularly shaped end portion of 57. A bore 57' extends through the plate 57 at the radial center of the gear teeth G2 and the pins 60 extend through a ball bearing 57B secured within said bore for permitting rotation of the assembly defined by 35' on the pin or shaft 60.

Removably secured within the end of the tubular arm 23' is a reversible gear motor MRA the output shaft of which is secured to a small bevel gear G1 which engages the teeth of the gear formation G2 in the member 57 for rotating, when operative, said gear and the arm assembly 35' about the axis of the shaft 60. The motor MRA is shown having the outer surface of its housing threaded and is received within a threaded portion of the end of 23' and locked in place by means of pins (not shown). Control of the degree of rotation of 35' relative to 23' is effected by means of limit defining stops 59a and 59b which respectively actuate the arm 54' of the limit switch secured against the end of arm 23' and are operative as described above for stopping the operation of motor MRA as well as otherwise affecting other servo members associated with the apparatus illustrated. The limit pins or stops 59a and 59b are removably and adjustably secured within a channel 58 extending in a circular path around the face of the plate 57 opposite the face containing the bevel gear teeth G2. The structure illustrated in FIG. 4 may be utilized for defining the positions of the switch arm actuating means 59a and 59b each of which may be movable to any position along the slotted track 59b. Other features of the joint illustrated in FIGS. 3 and 4 may also be incorporated in the apparatus illustrated in FIGS. 5 and 6 such as the means for effecting a rotary electrical coupling between the arm members. Also other positionally adjustable means for actuating the limit switch 54 and defining the limit of travel of the arm 35' relative to 23' may also be utilized.

FIG. 7 illustrates an electrical block diagram and includes control components of a typical adjustable manipulator having the electro-mechanical features hereinabove described. Power supplies are not illustrated in FIG. 7 in order to simplify the diagram but it is assumed that the correct source of electrical energy is provided on the correct side of all switches and motor controls. The diagram provided in FIG. 7 is intended to be only illustrative of a possible system employing single motors Mx, Mz, MR1, MA1 and MJ. The latter motor, MJ is representative of that motor or servo which is operative to activate the product handling fixture such as the jaws 87 of FIG. 2 or any other suitable device replacing same for seizing or grasping and releasing an article to be manipulated by the apparatus. Certain of the motors illustrated in FIG. 7 may be eliminated or may be multiplied in number depending on the particular mechanical aspects of the apparatus. For example there may be one or more motors such as MR1 which are operative to rotate a joint assembly about the longitudinal axis of the joint. There may also be one or more motors such as MA1 which are operative to pivot a joint arm such as 35 of FIG. 2 relative to a second arm such as 23". Accordingly modifications in the switching controls provided in FIG. 7 may be made in accordance with the teachings of this invention to provide sequential switching control as hereinafter described, depending on the particular configuration of the apparatus and the type of sequential action desired.

The notations F, S, and R shown associated with each of the power devices or motors refer respectively to pulse activated controls for said motors which, upon receipt of a control pulse or signal of extended duration from a respective limit switch, wil respectively cause the motor to operate in driving the component or assembly coupled thereto in a first direction, stop and reverse. In other words, when the control F is energized upon receipt of a control pulse or signal, the motor will rotate in a first direction; when control S is energized the motor will stop and when control R is energized upon receipt of a pulse, the motor will operate in the reverse direction. Motor Mx is operative to drive the entire manipulator along a guide or track between limits defined by adjustable switch activating means as described such as the movable block 23S of FIG. 2', the adjustably positionable pins 36a and 36b of FIG. 3 or the adjustably positionable pins 59a and 59b of FIG. 5 and 6.

The blocks referred to by the general notations SW refer to either single limit switches or pairs of limit switches having two switching positions illustrated within the block and referred to by the general notations S—. For example the switch SWx is secured to the overhead carriage 22 and is a bi-stable switch with a center neutral position to which its actuator arm normally returns when not depressed by a pin or stop secured to the overhead track. In movement along the track from left to right in the direction of the arrow "A," a first set of contacts referred to by the notation Sx2 is closed when the actuator of the switch SWx engages the adjustable stop which defines the rightward limit of travel of carriage 22 or manipulator assembly. Motion in the direction A may be initiated, for example, by pulsing the forward control F of Mx by closing or activating a switch 70 adapted to transmit a pulse thereto. The switch 70 may be closed by an operator or may be operative to scan a conveyor and generate a pulse on its output 70' upon the appearance of an article on the conveyor or otherwise identifying the presence of an article within the work area. When switch SWx becomes energized, the contacts or switching output Sx2 generate a control signal or pulse which is transmitted both to the stop control S of Mx and the forward control F of Mz thereby starting the latter motor to cause, for example, the assembly of manipulator elements including column 23' of FIG. 2 to be driven downward relative to 23. Downward movement of said assembly continues until a set of contacts Sz2 of a limit switch SWz (54 of FIG. 2) becomes activated by the uppermost stop or pin located on column 23' such as 23S of FIG. 2'. A pulse is then generated by contacts Sz2 and transmitted to the stop control S of motor Mz and simultaneously to the forward drive control F of motor MR1 causing, for example, rotation of the entire manipulator assembly situated below the overhead carriage 22 of FIG. 2 relative to said carriage. Thereafter, a pin such as 36a of FIG. 3 which has been adjustably positioned relative to a fourth limit switch SWR (54 of FIG. 3) contacts the actuator arm of said limit switch causing electrical contacts SR2 thereof to close and generate a pulse or control signal which is simultaneously transmitted to the stop control S or MR1 and the forward drive control F of motor MA1 (MRA of FIGS. 5 and 6). Motor MA1 thereafter drives the assembly 35 in pivotal action about the joint pivot until an adjustable pin such as 59b of FIGS. 5 and 6 engages and deflects the actuator arm or a limit switch SWA which is illustrated as 54 in FIGS. 5 and 6. Contacts SA2 of SWA are thereby closed and a pulse is generated which is transmitted to the stop control S of MA1 and the closure control F of the motor MJ closing, for example, the jaws 87 of the seizing head 70 against the article which is prepositioned in alignment therewith. Adjustable limit defining stops of the type illustrated in FIGS. 5 and 6 may be provided to control the degree of closure of the clamping head or jaws 87 and may be utilized, for example, to activate or deflect the actuator arm of a limit switch SWJ or the servo opening and closing the jaws or clamp may be operative whereby the limit of closure of the jaw elements is defined by the force developed in compressively engaging the article to be handled. The output of contacts SJ2 of the switch SWJ is also passed to the reverse drive control R of motor MA1 causing, for example, the limb assembly 35 to be driven in the reverse direction until the other limit thereof, defined by a second limit pin such as 59a of FIG. 5 is attained, whereupon a second set of contacts SA1 of SWA is closed upon the engagement of the actuator thereof against said pin and a control signal is generated on the circuit including SA1 which is passed to both the stop control S of MA1 and the reverse drive control R of motor MR1. A control diode 74–4 is provided in the output of contacts SA2 and the stop control S of motor MA1 between which diode and stop control the output of contacts SA1 is connected to that energization of SA1 will result in pulsing only control S of MA1 and not F of motor MJ.

Operation of rotary joint motor MR1 in reverse eventually results in the closure or activation of the contacts SR1 of switch SWR which simultaneously energizes the stop control S of motor MR1 and the reverse drive control R of motor Mz. A uni-directional gate or diode 74-3 is provided between the output of SR2 and S of MR1. The output of SR1 is connected between the diodes 74-3 and S of MR1 so that the signal generated will not energize F of MA1 to which SR2 is connected directly. Energizing R of Mz causes, in the apparatus of FIG. 2 for example, upward movement of the column 23' and the assembly therebelow relative to the upper column 23 until the contacts Sz1 are closed when the upper stop provided in slot 23S is operative to deflect the actuator of the limit switch SWz (54) effecting closure of contacts Sz1. The output of Sz1 is passed simultaneously to the stop control S of motor Mz resulting in stopping the upward movement of 23' and starting travel of the entire manipulator leftward along the overhead track 21. Movement of the manipulator continues until contacts Sx1 of the limit switch SWx are closed by a pin or stop, defining the leftward limit of travel of the manipulator, deflects or otherwise is effective in closing contacts Sx1 of switch SWx which results in transmission of a control signal to the stop control S of Mx and also to the reverse control R of the motor MJ resulting in opening the jaws of the manipulator to release the article held thereby at a spatial location which is defined by the degree of the hereinabove described movements. The described cycle is repeated when the cycle switch 70 next becomes activated by, for example, sensing the next article as it moves into the field of said device which results in a pulse being transmitted on line 70' to the forward drive control F of motor Mx.

A plurality of other circuits and switches are illustrated in FIG. 7 for rendering the control system and the manipulator apparatus more flexible in operation. For example, in certain article transfer or handling functions, it may be desired to retain the manipulator fixed relative to the guide track along which is is moveable. In other words, it may not be desired to operate motor Mx so that the overhead carriage will not travel along the overhead track during a particular cycle of operation. The article handling or seizing head 80 will still have the ability to engage an article; rotate relative to arm 35'; pivot or rotate through a second arc when 35' is driven about the axis defined by the shaft 60 of the joint 50; move vertically upward and downward as column 23' is driven into and out of column 23 relative to the overhead carriage 22. To effect removal of the motor Mx from the control system of FIG. 7, a first switch 71 in the circuit between cycle start switch 70 and F of motor Mx is opened and a second switch 71-1 is closed completing a circuit between the contacts of switch 70 and the forward drive control F of motor Mz. Thus, when switch 70 becomes activated, motor Mz will be started to drive the column 23' downward relative to 23 rather than motor Mx and the cycle will include the operation of all motors but the latter. Since the output of contacts Sz1 is connected to M of Mx, a switch 72-1 between Sz1 and R of Mx is opened.

In the event that it is desired to operate all the servos of the manipulator with the exception of motors Mz and Mx, switching means are provided for connecting the cycle start switch 70 directly to the forward drive control F of motor MR1, switches 71 and 71-1 are opened and a further switch 71-2 in the line between 70 and F of MR1 is closed. Since the output of SR1 is connected directly to R of motor Mz, switch 72-2 in said circuit is opened and a switch 71-2, disposed in the circuit between 70 and the forward drive control F of motor MT1 is closed so that, when cycle start switch 70 becomes activated, the motor MT1 will be controlled to operate rather than motor Mz. Simultaneously, a switch 72-2 between the contacts SR1 and R of Mz is opened preventing reverse operation of Mz upon activation of the switch SWR.

If it is desired to operate the manipulator apparatus without rotating the assembly including column 23 relative to the base or overhead carriage 22, switch 71-2 is opened as is a switch 72-3 between contacts SA1 and R of MR1 and a switch 71-3 disposed between 70 and F of MA1 is closed connecting the sensing relay or switch 70 directly with the forward drive for motor MA1.

If it is desired to operate the article seizing means or jaws immediately upon a predetermined degree of movement of any of the manipulator components or assemblies as defined by the hereinabove described limit stop means, a plurality of additional circuits and switches are provided in FIG. 7 to effect such control variations. For example, the output of contacts Sz2 is connected directly to the reverse drive R of motor MJ through a switch 75-2 which is closed when a switch 75-1, located in the circuit between contacts Sx1 of switch SWx and R of MJ. If both motors Mx and Mz are deactivated during a cycle, switches 75-1 and 75-2 are opened and a third switch 75-3, located in the circuit between SR1 and R of MJ, is closed thereby resulting in the deactivation or opening of the jaws upon the termination of the cycle as defined by closure of contacts SR1. Finally, if it is desired to close and open the jaws 87 at the limits of a cycle defined solely by the rotation of the assembly including said jaws and arm 35 around the joint J, a fourth switch 75-4, located in a circuit including SA1 and R of MJ, is closed resulting in deactivating or opening said jaws after they have moved in a predetermined arc about the axis of the joint J as defined by the second limit stop such as 59b illustrated in FIG. 5.

It is briefly noted that if it is desired to retain certain of the servo motors operative in a predetermined control cycle while deactivating the controls for others of said motors, switches similar to those provided in FIG. 7 for connecting and disconnecting respective circuits between the contacts of the switches SW and the controls for said motors may be provided and may be selectively opened and closed depending on the particular type of control desired. If said switches are bi-stable solenoid operated electro-mechanical or solid state switching devices, they may be remotely selectively opened and closed by an operator located at a console or switching panel having outputs operatively connected to each switch or by an automatic programming means such as a card or tape reading apparatus. It will then be necessary only to predetermine the limits of travel of one component or assembly relative to the other by prepositioning the limit stop means illustrated, for example in FIGS. 2' and 3 to 6.

In a further mode of automatic control, herein proposed, the limit stop means illustrated in FIGS. 2' and 3–6 may be eliminated provided that means are provided for activating the particular limit switch or scanning relay such as 54 with predetermined degrees of lineal movement or rotation of one component or assembly relative to the other. For example, if an electro-mechanical limit switch is utilized to scan and effect control of the motion of one component or assembly relative to the other, its actuator may be deflected with predetermined, equal increments of rotation or lineal motion by riding into and out of indentations defined by equi-spaced holes or serrations in the surface against which it is urged. For example, the track 67 illustrated in FIG. 3 or 58 of FIG. 5 may be replaced by a plurality of equi-spaced holes extending in the same path or by a plurality of shallow projections which are operative to intermittently deflect the actuator of the switch and cause closure and opening of the contacts connected thereto. Each motor may thus be controlled by a predetermining controller such as a presettable counter of the self-resetting type which generates a control pulse upon uncounting in either or both directions which pulse may be transmitted on the circuits 70'-1 to 70'-8 of FIG. 7 to effect the same type of control as descibed hereinabove. In other words, each of the switches bearing the notations SWz, SWR, SWA and SWJ may be replaced by presettable predetermining controllers. The block denoted Sz1 may be a self-resetting, presettable counter operative to uncount upon deflection of the actuator arm thereof in a first direction such as when 23' moves downward relative to column 23 and SZ2 may be a similar, self-resetting counter operative to uncount when the actuator arm thereof deflects as 23' moves upward relative to 23. Similarly the other controls SWR, SWA, and SWJ may have respective bi-directional counting mechansims $Sz1$, $Sz2$; $SR1$, $SR2$; $SA1$, $SA2$; and $SJ1$, $SJ2$. The predetermining counters may be preset to reset at a predetermined value and transmit a control pulse by local manual adjustment of each or upon receipt of a predetermined number of control pulses as transmitted from a remote controller, card or tape reading device, computer, etc. Many variations are possible depending on the number of connections and the illustrated switches may be replaced by pluggable connections which when disconnected by unplugging are effected in a similar manner to opening a switch.

Also illustrated in FIG. 7 are diodes 76–1, 76–2, 77–1, 77–2, and 78 located in the respective illustrated circuits which perform the important function of permitting a control pulse to be passed in only one direction on said circuit so that a pulse travelling in the opposite direction from a control relay or limit switch will not energize a servo control situated beyond the diode. Manually operative knife switch 79 is located in a circuit between contacts SJ2 and control F of motor MX permitting closure of said contacts to be utilized to recycle the apparatus when switch 79 is closed and relay 70 is either automatically inoperative or switch 71 is opened. Thus the cycle may be repeated either by operation of relay 70 or closure of contacts SJ2 of switch SwJ.

In a modified form of the invention, it is noted that the article seizing means of the manipulator such as jaw head 70 may be replaced by, in addition to other types of seizing means, a head having a tool, scanning device or other mechanism associated with assembly, inspection or any intermittently operative work performing function to provide an easily adjustable self-recycling apparatus having a high degree of flexibility as described. For example, the article seizing means 80 illustrated in FIG. 2 may be replaced by a suitable servo operated device operative to inspect or otherwise perform on a workpiece which is pre- positioned relative to the apparatus when the article sensing relay 70 of FIG. 7 becomes energized. In such case, the motor MJ illustrated in FIG. 7 may be any suitable servo or solenoid operated mechanism operative to activate said tool or head in the sequence provided by the control means illustrated in FIG. 7. An automatic adjustable apparatus is thus provided which is applicable to many automation functions without the need for complex automatic control apparatus such as recording or numerical control means.

It is to be understood that the above-described arrangements are illustrative of the application of the principles of the invention. Numerous other arrangements may be devised by those skilled in the art without departing from the spirit and scope of the invention.

I claim:

1. Automatic machinery comprising a plurality of separately movable components including first, second and third assemblies assembled together and movably mounted with respect to each other, means for guiding said second assembly in a fixed path relative to said first assembly, first power operated means secured to said first assembly and operatively connected for moving said second assembly relative to said first assembly, second power operated means secured to one of said assemblies, said second power operated means being operative for securing said first and second assemblies and preventing their movement with respect to each other, third power operated means secured to said second assembly for holding an article, means on said automatic machinery for performing work, and automatic control means for predeterminately controlling operation of said first power means to predeterminately move said second assembly with respect to said first assembly, said automatic control means being also operative to activate said second power means after said first and second assemblies are predeterminately located relative to each other so as to lock and secure said two assemblies and prevent their further relative movement during operation of said third power means, said automatic control means being also operative to activate said second power means to unlock said first and second assemblies at a predetermined time in a cycle of operation of said automatic machinery.

References Cited

UNITED STATES PATENTS 1,992,686    2/1935    Anderson             198—38
3,260,375    7/1966    Lemelson.

ROBERT G. SHERIDAN, *Primary Examiner.*